Figure 2:
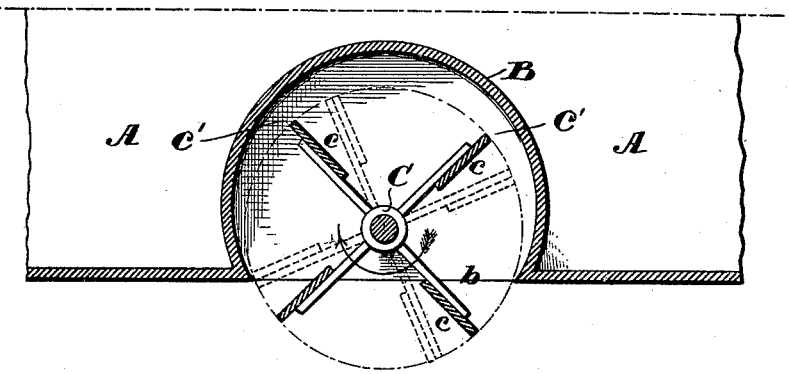

(No Model.)

W. H. WIGMORE.
SHIP'S PROPELLER.

No. 432,846. Patented July 22, 1890.

WITNESSES:
J. Henderson
R. M. Fleischmann

INVENTOR:
William H. Wigmore,
By his Attorney,
Horace Pettit.

UNITED STATES PATENT OFFICE.

WILLIAM H. WIGMORE, OF PHILADELPHIA, PENNSYLVANIA.

SHIP'S PROPELLER.

SPECIFICATION forming part of Letters Patent No. 432,846, dated July 22, 1890.

Application filed April 15, 1890. Serial No. 347,947. (No model.)

*To all whom it may concern:*

Be it known that I, WILLIAM H. WIGMORE, of the city of Philadelphia and State of Pennsylvania, have invented a certain new and useful Improvement in Ships' Propellers; and I do hereby declare the following to be a full, clear, and exact description thereof, reference being had to the accompanying drawings, forming part of this specification.

My invention has relation to that form of ship propellers or wheels which revolve in air-tight cylindrical casings or drums located on each side of the vessel, preferably intermediate of its ends, as shown and described in Letters Patent of the United States, No. 334,632, granted to Henry C. Bender, January 19, 1886, and also to such as are shown and described in application for Letters Patent of William H. Wigmore, filed in the United States Patent Office May 10, 1889, Serial No. 310,338. One form of specific construction of device, as described in the said last-mentioned application, is herein shown in Fig. 1 and described, but not herein specifically claimed, in which last application certain claims were withdrawn by the applicant with a reservation clause for the purpose of making a separate application to include said claims and the matter contained therein, for which purpose and under which provisions this application is now made.

My invention herein set forth and claimed consists in the features and elements hereinafter particularly set forth and described.

As stated in my previous application referred to, it has been found in practice that as the blades in the construction described in Letters Patent No. 334,632 enter the casing and revolve in it, the water adhering to the blades is by centrifugal force thrown to their outer edges, and as there is no appreciable clearance between the edges of the blades and the casings, such water dams up or accumulates in ripples or ridges at said edges and revolves with the blade in impingement against the casing-wall to produce undue friction on the blades, resulting in a loss of speed and a needless consumption of power. Again, as there is no clearance between the blades and the casing, the blades as they revolve through the latter carry with them the air in the top of the casing to mix it with the water in the bottom of the casing and produce a churning of such air and water, besides taking from the top of the casing the air that should remain there, all of which is detrimental to the efficiency of the action of the wheels.

My invention has for its object, as in the invention described in my former application, to avoid these described objections, and to this end I make the wheel snugly fit the mouth or entrance of the casing for the purpose of preventing the wheel carrying water into the casing beyond the edge of its blades or diameter and of expelling water from the casing, as above described; but beyond the casing-mouth its interior diameter or size, in cross-section, is enlarged to provide ample clearance between the casing and the wheel for the escape of water and air from the outer edges of the blades.

My invention consists in a wheel-casing having a mouth or entrance closely approximating the size of that part of the paddle-wheel revolving through the said mouth and paddle-wheel set to revolve therein of a diameter in cross-section smaller than the interior diameter of the casing to give a clearance between the outer edges of the blades of the paddle-wheel and the interior of the casing greater than the clearance-space between the mouth of the casing and edges of the blades, which said paddle-wheel is set either concentrically with the casing or eccentrically therewith, either of which forms may be employed in the construction of my invention.

In the accompanying drawings similar letters of reference refer to similar parts throughout.

Figure 1:
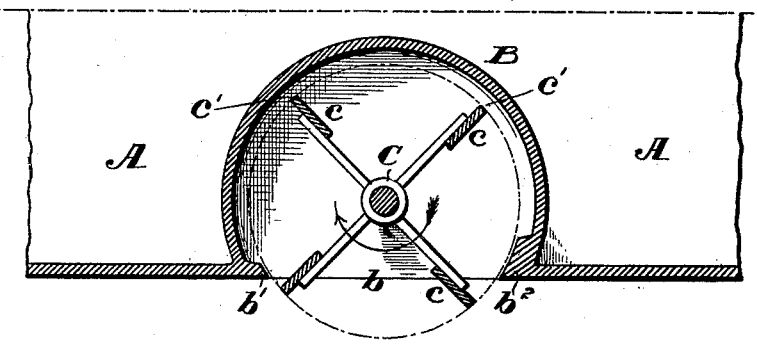

Figure 1 is a sectional elevation of a part of a ship's hull with the wheel and air-tight casing in section, showing the paddle-wheel set concentrically with the casing. Fig. 2 is also a sectional view, as in Fig. 1, but with the paddle-wheel set eccentrically in the casing, and showing in dotted lines the blades in their rotation at the mouth of the casing.

A indicates the ship's hull, and B is an air-tight cylindrical casing, in which the propeller or paddle-wheel C is set, having the four blades C, which, however, may be otherwise constructed, if desired. The mouth or entrance $b$ is of a diameter closely approximating the size of that part of the wheel C revolving through said mouth, so that the blades of the latter make a snug fit therewith as they revolve through said mouth, as plainly indicated in drawings, where the wheel C is set concentrically with the casing B, as shown in Fig. 1. The diameter of the mouth $b$ is continued within the casing for a short distance on both sides to form abutments $b'$ $b^2$. As described in my other application referred to, the abutment $b'$ is at that side of the mouth on the upstroke of the blades and the abutment $b^2$ on the opposite side, whereat the blades make their downstroke. The abutment $b^2$, preferably, may be made longer than the abutment $b'$, as shown in Fig. 1. The short abutment $b'$ prevents the blade $c$ taking water into the casing beyond the diameter of the wheel, and the abutment $b^2$ assists the blades in expelling the water from the casing. By making this abutment $b^2$ of a long length, as shown in Fig. 1, such assistance is materially increased.

The diameter of the casing B, or its size in cross-section, is enlarged or made greater than the diameter of the wheel C to provide a clearance-space $c'$ between the outer edges of the blades and the interior wall of the casing B. The provision of the clearance or space $c'$ admits of the water, which adheres to the blades as they rise in and pass through the casing B, to be thrown by centrifugal force from the outer edge of the blades to the casing-wall, and then drops to the bottom of the casing without interfering with or obstructing the movement of the blades in the casing. For the same reason the air escapes or flies from the ends or edges of the paddles and remains in the top of the casing, and churning of air and water in the bottom of the casing is avoided. As the water and air are free to escape from the blades, the latter freely revolve through the casing without being subject to friction from such water and air, and hence the speed of the wheel is not retarded, and needless consumption of power is avoided. The side arms for the paddles or blades are preferably made of a sharp oval, in cross-section, so that they will move more easily through the water, and the blades are preferably fastened to the arms by countersunk screws, with their slots suitably filled or calked, so as to avoid all recesses or projections on the wheel or its parts in or about which air could collect, and thus prevent the wheel carrying air down from the casing into the water, it being especially desirable to maintain a given volume or pressure in the casing, in order that the water cannot rise therein above a certain or given height to interfere with the efficiency of the wheel.

From the foregoing it will be noted that the wheel-casing is so constructed that its mouth or entrance makes a close or snug fit with that part of the wheel revolving through said mouth, and that the interior diameter or size in cross-section is larger than the diameter of the wheel, in order to obtain the necessary clearance between the wheel and casing. I therefore do not limit myself to any construction of interior diameter of the casing, as it is obvious that it may be variously formed to make it of a larger diameter or size than that of the wheel and of a diameter or size different from that of the mouth of the casing to secure the two functions of, first, preventing the water beyond the edge of the wheel from passing into the casing, and, second, providing ample clearance between the wheel-blades and casing to prevent the formation of ripples or ridges and consequent friction between the casing and the edge of the wheel-blades.

In my invention there must be a material clearance-space between the edges of the blade $c$ and the interior wall of the casing B, for the purpose hereinbefore particularly mentioned, and at the same time the construction must be such that at the mouth or entrance of the casing there must be no more clearance between the blades $c$ and the edges of the mouth than is necessary to allow in ordinary construction of a free passage of the blade in its revolution. Where, therefore, the concentric construction shown in Fig. 1 is employed, the abutments shown are necessary. Where, however, the construction shown in Fig. 2, having blades set eccentrically to the casing, is employed, the blades $c$ necessarily come in close proximity or contact with the interior wall of the casing at the edges of the mouth $b$, as shown in the dotted lines, which perform the functions of the abutments in the other construction heretofore described, while at the same time clearance between the edges of the blade $c$ and the interior walls of the casing B is afforded. The fact that the circle described by the blades $c$ in their revolution is not concentric with that of the casing B makes no material difference, provided ample clearance is afforded above the edges of the mouth between the blades $c$ and the interior of the casing.

Having thus described my invention, what I claim, and desire to secure by Letters Patent, is—

1. In combination with a ship's hull, a paddle-wheel, a casing having a mouth or entrance closely approximating the size of that part of the wheel revolving through said mouth to give a clearance between the wheel and the mouth, and an interior diameter or size in cross-section larger than the diameter of the wheel to give a clearance between the outer edges of the blades of the paddle-wheel and interior of the casing greater than the clearance between the mouth and the wheel, substantially as hereinbefore set forth and described.

2. A ship's hull having an air-tight cylindrical wheel-casing, the mouth and interior diameters of which are of different concentric diameter, substantially as hereinbefore set forth and described.

3. A ship's hull having a paddle-wheel, an air-tight casing having a mouth formed by a radius closely approximating that of the wheel, and an interior size and cross-section formed by a radius larger than that of the wheel and larger than that of the mouth, substantially as hereinbefore set forth and described.

4. A ship's hull having a paddle-wheel and wheel-case, the interior diameter of which is greater than the diameter of its mouth, and said diameters being eccentric with each other, substantially as hereinbefore set forth and described.

5. A ship's hull having a wheel-casing, the interior diameter of which is greater than the diameter of its mouth, and a paddle-wheel set eccentrically in the said casing having a mouth closely fitting to the edges of the blades of the paddle-wheel as they revolve therethrough, and a clearance-space between the edges of the blades of the said paddle-wheel and the interior wall of the casing, substantially as hereinbefore set forth and described.

6. A wheel-casing B, a paddle-wheel C, set eccentrically in the said casing to revolve therein, a mouth $b$, constructed of a size so that the edges of the blade $c$ of the wheel C shall come in close proximity in their revolutions through the same, and a clearance-space in the interior of the said casing above the said mouth between the edges of the blade $c$ and the interior walls of the casing B, substantially as hereinbefore set forth and described.

In witness whereof I have hereunto set my hand this 14th day of April, A. D. 1890.

WILLIAM H. WIGMORE.

Witnesses:
 WM. L. NEVIN,
 HORACE PETTIT.